(12) United States Patent
Deshmukh et al.

(10) Patent No.: US 7,677,114 B2
(45) Date of Patent: Mar. 16, 2010

(54) TORQUE SENSOR FOR ELECTRIC POWER STEERING SYSTEM

(75) Inventors: Kiran Manohar Deshmukh, New Delhi (IN); Ravindra Nath Sharma, Haryana (IN); Anudeep Garg, Pune (IN); Nitin Jain, Gurgaon (IN); Jose Jimmy, Sheffield (GB); Atul Bishnoi, Gurgaon (IN)

(73) Assignee: Sona Koyo Steering Systems Ltd., Gurgaon (IN)

( * ) Notice: Subject to any disclaimer, the term of this patent is extended or adjusted under 35 U.S.C. 154(b) by 95 days.

(21) Appl. No.: 11/731,353

(22) Filed: Mar. 30, 2007

(65) Prior Publication Data
US 2007/0246290 A1 Oct. 25, 2007

(30) Foreign Application Priority Data
Mar. 31, 2006 (IN) .......................... 932/DEL/2006

(51) Int. Cl.
*G01L 5/22* (2006.01)
(52) U.S. Cl. ............................. 73/862.328
(58) Field of Classification Search ............ 73/862.321, 73/862.325, 862.326, 862.328; 324/207.2, 324/207.21, 207.25; 180/443, 444, 446; 33/1 PT, 1 N
See application file for complete search history.

(56) References Cited

U.S. PATENT DOCUMENTS

| | | | |
|---|---|---|---|
| 2,634,991 A | 4/1953 | Stevens | |
| 4,450,729 A * | 5/1984 | Troeder et al. | 73/862.328 |
| 4,645,024 A | 2/1987 | Takabayashi | |
| 4,676,331 A * | 6/1987 | Iwaki et al. | 180/444 |
| 4,724,711 A | 2/1988 | Sakakibara et al. | |
| 4,724,917 A | 2/1988 | Naito et al. | |
| 4,778,022 A | 10/1988 | Kamiya | |
| 4,784,234 A | 11/1988 | Naito et al. | |
| 4,865,143 A | 9/1989 | Hashimoto et al. | |
| 4,939,435 A * | 7/1990 | Takahashi et al. | 318/432 |
| 5,029,659 A | 7/1991 | Saito | |
| 5,046,372 A | 9/1991 | Taniguchi et al. | |

(Continued)

OTHER PUBLICATIONS

U.S. Appl. No. 11/801,245, filed May 9, 2007; In re: Kiran Manohar Deshmukh et al., entitled *Electric Power Assist Module for Steering System*.

(Continued)

*Primary Examiner*—Lisa M Caputo
*Assistant Examiner*—Freddie Kirkland, III
(74) *Attorney, Agent, or Firm*—Womble Carlyle Sandridge & Rice, PLLC

(57) ABSTRACT

A torque sensor, which is for an electric power steering system that has an output shaft for rotating in response to rotation of an input shaft, may include a first rotor for rotating with the input shaft, a second rotor for rotating with the output shaft, a first pinion gear mounted for rotating in response to rotation of the first rotor, a first magnet mounted for rotating with the first pinion gear, a second pinion gear mounted for rotating in response to rotation of the second rotor, a second magnet mounted for rotating with the second pinion gear, a first sensor positioned for sensing an angular position of the first magnet, and a second sensor positioned for sensing an angular position of the second magnet. The first rotor and the second rotor are mounted so that there can be relative rotation between the first rotor and the second rotor.

26 Claims, 5 Drawing Sheets

U.S. PATENT DOCUMENTS

| | | | |
|---|---|---|---|
| 5,218,279 A * | 6/1993 | Takahashi et al. | 318/560 |
| 5,763,793 A | 6/1998 | Ng et al. | |
| 6,186,267 B1 | 2/2001 | Hackl et al. | |
| 6,367,337 B1 * | 4/2002 | Schlabach | 73/862.331 |
| 6,386,313 B1 | 5/2002 | Choi | |
| 6,490,540 B1 | 12/2002 | Kurzeja et al. | |
| 6,578,437 B1 * | 6/2003 | Moerbe | 73/862.328 |
| 6,880,254 B2 * | 4/2005 | Uehira et al. | 33/1 PT |
| 6,909,282 B2 * | 6/2005 | Onishi et al. | 324/207.25 |
| 6,931,312 B2 * | 8/2005 | Shin | 701/41 |
| 7,021,418 B2 | 4/2006 | Tominaga et al. | |
| 7,201,070 B2 * | 4/2007 | Tokumoto | 73/862.328 |
| 7,311,173 B2 | 12/2007 | Takimoto et al. | |
| 2002/0111763 A1 * | 8/2002 | Koga | 702/151 |
| 2004/0059486 A1 * | 3/2004 | Takuma et al. | 701/41 |
| 2004/0078166 A1 * | 4/2004 | Shin | 702/145 |
| 2004/0244209 A1 * | 12/2004 | Uehira et al. | 33/1 PT |
| 2005/0077101 A1 | 4/2005 | Yamamoto et al. | |
| 2007/0229062 A1 * | 10/2007 | Katoh | 324/207.25 |
| 2007/0241742 A1 * | 10/2007 | Arakawa et al. | 324/207.25 |
| 2008/0264713 A1 | 10/2008 | Deshmukh et al. | |
| 2009/0058405 A1 * | 3/2009 | Oike et al. | 324/207.25 |

OTHER PUBLICATIONS

Office Action mailed Mar. 5, 2009 for U.S. Appl. No. 11/801,245; In re: Deshmukh et al., entitled Electric Power Assist Module for Steering System.

* cited by examiner

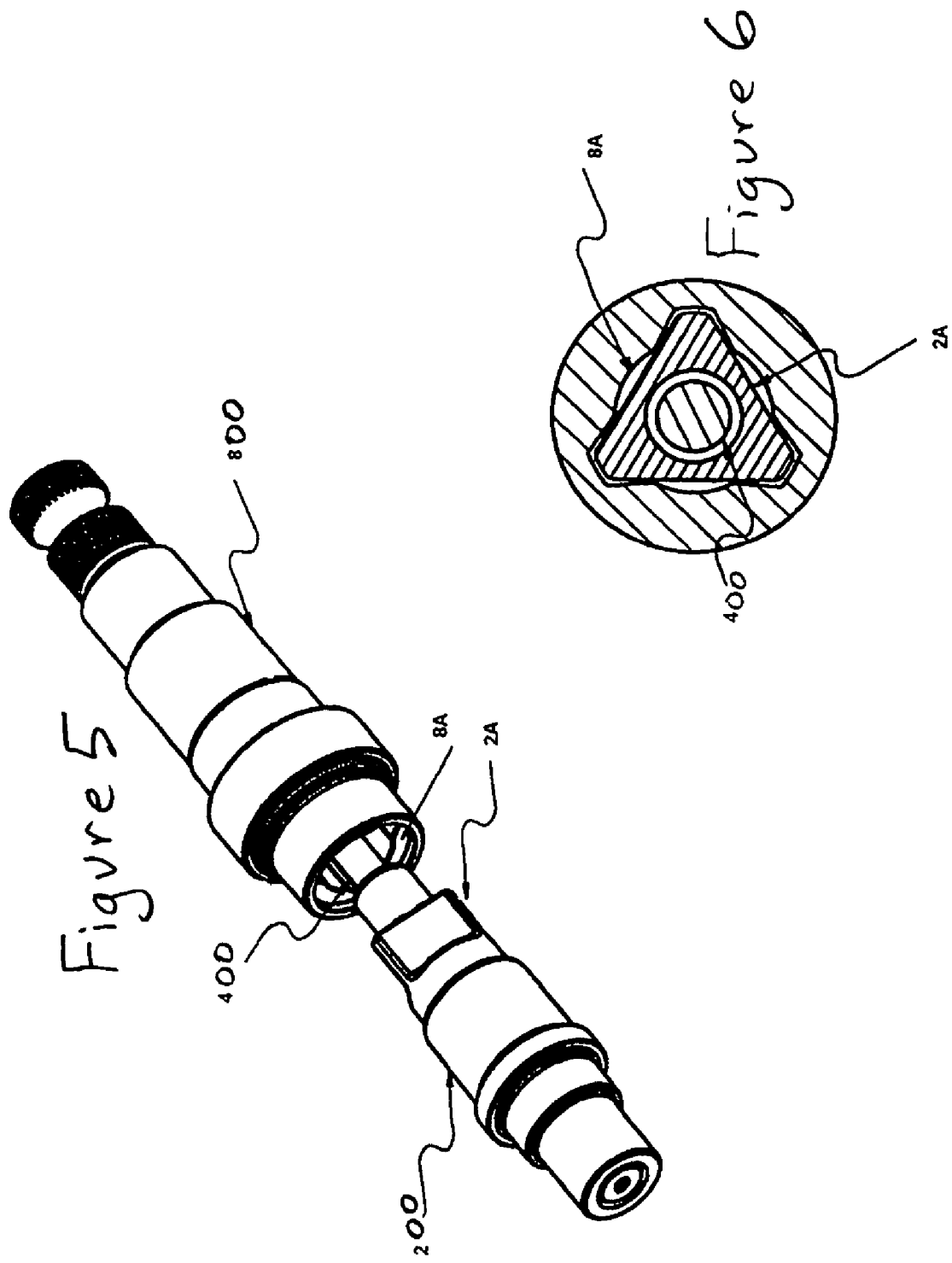

TORQUE SENSOR FOR ELECTRIC POWER STEERING SYSTEM

CROSS-REFERENCE TO RELATED APPLICATION

The present application claims priority to Indian Patent Application No. 932/Del/2006, which was filed Mar. 31, 2006. The entire disclosure of Indian Patent Application No. 932/Del/2006, which was filed Mar. 31, 2006, is incorporated herein by reference.

BACKGROUND OF THE INVENTION

The present invention relates to a torque sensor and, more specifically, to a torque sensor for an electric power steering system for an automobile.

Electric power steering systems provide assistance to a driver that is turning a steering wheel. An electric power steering system provides assistance by way of an electronically controlled motor in response to detection of the torque applied at the steering wheel. Accordingly, such system needs to detect a steering torque applied at the steering wheel.

FIG. 1 shows one example of a conventional electric power steering system. In general and as shown in FIG. 1, an electric power steering system has a torsion bar 4 fixed coaxially between an input shaft 2 and an output shaft 8 of the steering system. When a driver applies torque at the steering wheel 1, the torsion bar 4 is twisted and a torque sensor 3 sends an electrical signal that is proportional to the applied torque to an electronic control unit ("ECU") 6. The ECU 6 functions so that electrical current is supplied to the motor 7 based on the signals from the torque sensor 3, so that the motor 7 applies assisting torque to the output shaft 8 by way of a reduction gear mechanism 5. The output shaft 8 steers the tires 12 via tie-rods 11 and a rack and pinion gear mechanism 10, 9.

It is conventional for a potentiometer-based, contact-type of torque sensor to be used for an electric power steering system. It is known for such a potentiometer-based, contact-type of torque sensor to utilize a resistor film on a rotor fixed to the output shaft and sliding contact probes mounted on a rotor fixed to the input shaft. Whenever there is a torque in the system, the torsion bar twists and the rotors containing the resistive film and the contact probes slide with respect to one another, thereby leading to a change in the voltage drop proportional to the twist in the torsion bar. Slip rings are used to transfer input power to the resistor film and to receive the measured torque signal. An example of such a torque sensor is described in U.S. Pat. No. 5,763,793, which issued on Jun. 9, 1998. These sensors can suffer from poor responsiveness because of sliding friction, and they can suffer from a relatively short life due to the limited life of the slip rings and contact probes.

Another type of conventional electric power steering system uses a reluctance-based, non-contact type of torque sensing device. Torque is detected based on a change in reluctance in response to twisting in the torsion bar. An example of such a torque sensing device is explained in U.S. Pat. No. 5,046,372, which issued on Sep. 10, 1991. This type of torque sensing device can be costly and difficult to assemble.

BRIEF SUMMARY OF SOME ASPECTS OF THE INVENTION

One aspect of the present invention is the provision of improvements to a torque sensor for an electric power steering system.

In accordance with one aspect of the present invention, a torque sensor is provided that may be used in an electric power steering system that has an output shaft for rotating in response to rotation of an input shaft. The torque sensor may include a first rotor for rotating with the input shaft, a second rotor for rotating with the output shaft, a first pinion gear mounted for rotating in response to rotation of the first rotor, a first magnet mounted for rotating with the first pinion gear, a second pinion gear mounted for rotating in response to rotation of the second rotor, a second magnet mounted for rotating with the second pinion gear, a first sensor positioned for sensing an angular position of the first magnet, and a second sensor positioned for sensing an angular position of the second magnet. The first rotor and the second rotor are mounted so that there can be relative rotation between the first rotor and the second rotor.

Gear teeth of the first pinion gear may be meshed with gear teeth of the first rotor, so that the first pinion gear is directly driven by the first rotor, and gear teeth of the second pinion gear may be meshed with gear teeth of the second rotor, so that the second pinion gear is directly driven by the second rotor.

The first magnet may be a two-pole magnet mounted to the first pinion gear for rotating with the first pinion gear about a first axis, and the second magnet may be a two-pole magnet mounted to the second pinion gear for rotating with the second pinion gear about a second axis. The first sensor may be co-axially aligned with the first axis for sensing the angular position of the first magnet, and the second sensor may be co-axially aligned with the second axis for sensing the angular position of the second magnet.

In accordance with one aspect of the present invention, the torque sensor may be in combination with at least the input shaft and the output shaft of the power steering system. In accordance with this aspect, the second rotor may be connected to the output shaft for rotating with the output shaft, the first rotor may be connected to the input shaft for rotating with the input shaft, and the output shaft and the input shaft may be connected to one another via a torsion bar. More specifically, a first end of the torsion bar may be connected to the input shaft so that the first end of the torsion bar rotates with the input shaft, and a second end of the torsion bar may be connected to the output shaft so that the second end of the torsion bar rotates with the output shaft.

According to one aspect of the present invention, the input shaft and the output shaft may be operatively associated with one another via a cavity being in receipt of a profile. The cavity and the profile may be cooperative for allowing, yet restricting to a predetermined limit, angular relative movement between the input shaft and the output shaft. The input shaft may include the profile, and the output shaft may include the cavity. In one example, the cavity and the profile are each substantially triangular; however, other shapes are also within the scope of the present invention.

In accordance with one aspect of the present invention, the torque sensor includes, or is otherwise associated with, a processing apparatus (e.g., a microcontroller, computer, or the like) that is operatively associated with the first and second sensors for receiving signals that are respectively indicative of the angular position of the first magnet and the angular position of the second magnet. The processing apparatus is for processing the signals from the sensors. For example, the processing apparatus may be for determining an angular difference between the first magnet and the second magnet. The processing apparatus may also generate a pulse width modulation signal that is proportional to the angular difference between the first magnet and the second magnet. A filter apparatus may be provided for converting the pulse width modulation signal to an analogue voltage signal proportional to torque applied to the input shaft. In one example, the processing apparatus comprises a processor (e.g., computer processor, or the like) and an algorithm (e.g., one or more programs, software modules or the like for providing instructions to the processor with regard to how the data is to be processed).

Other aspects and advantages of the present invention will become apparent from the following.

BRIEF DESCRIPTION OF THE DRAWINGS

The accompanying drawings, which are listed below, are not necessarily drawn to scale.

FIG. 5 is an isolated, partially exploded view of the torsion bar, input shaft and output shaft, and FIG. 5 shows a triangular profile of the input shaft and a triangular cavity of the output shaft that are for allowing a limited range of angular relative movement between the input and output shafts, in accordance with the exemplary embodiment of the present invention.

FIG. 6 is a cross-sectional view of the torsion bar, input shaft and output shaft in an assembled configuration, with the cross-section taken perpendicularly to their lengths and through the triangular profile and the triangular cavity, in accordance with the exemplary embodiment of the present invention.

DETAILED DESCRIPTION OF EXEMPLARY EMBODIMENT

Figure 1:
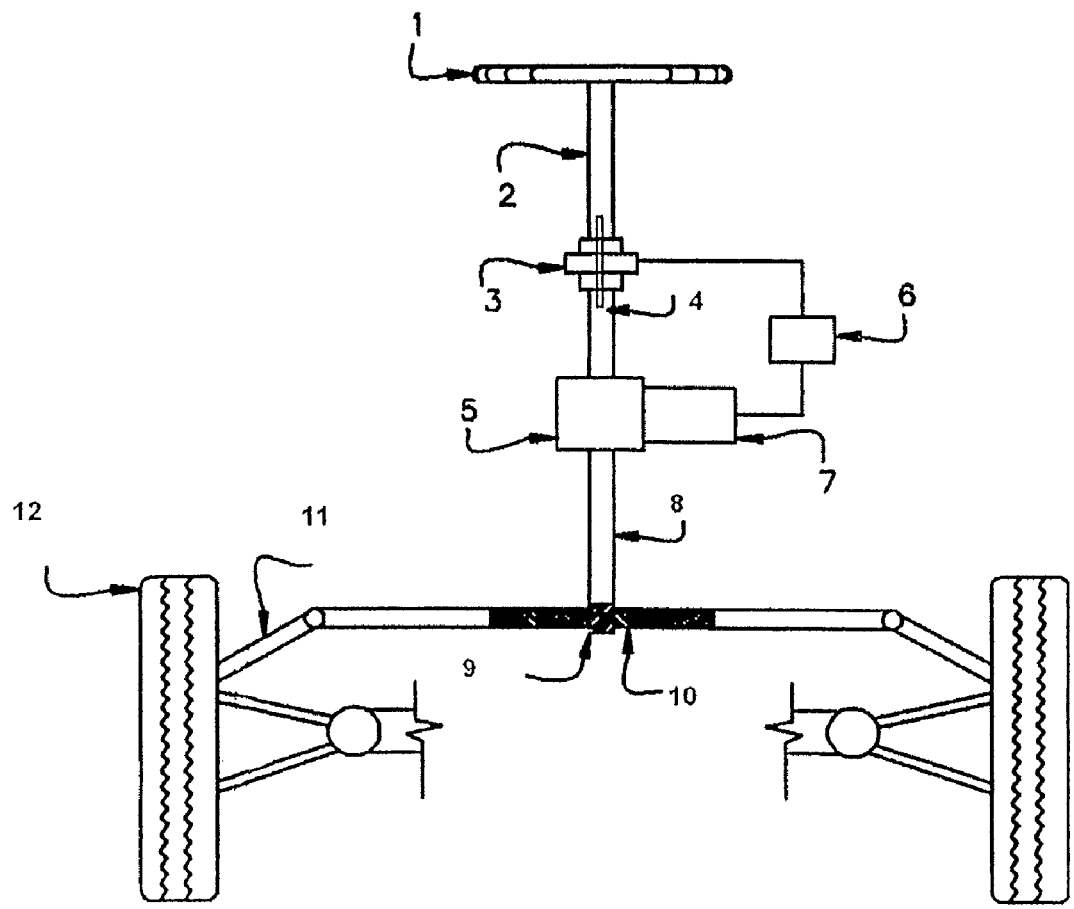
FIG. 1 schematically illustrates a conventional electric power steering system.

Referring now in greater detail to the drawings, in which like numerals refer to like parts throughout the several views, an exemplary embodiment of the present invention is described in the following. Generally described and as best understood with reference to FIGS. 2 and 3, a torque sensor 300 of the exemplary embodiment of the present invention is compact, cost-effective, and includes a Hall effect-type of sensing mechanism for detecting the torque applied at a steering wheel (e.g., see steering wheel 1 in FIG. 1) or other type of device for controlling steering of a vehicle. An electric power steering system of the exemplary embodiment of the present invention can be like the electric power steering system shown and described with reference to FIG. 1, except that the torque sensor 3 of FIG. 1 is replaced with the torque sensor 300 of the exemplary embodiment, the input shaft 2 of FIG. 1 is replaced with an input shaft 200 of the exemplary embodiment, the output shaft 8 of FIG. 1 is replaced with an output shaft 800 of the exemplary embodiment, and the torsion bar 4 of FIG. 1 may be replaced with a torsion bar 400 of the exemplary embodiment.

Figure 3:
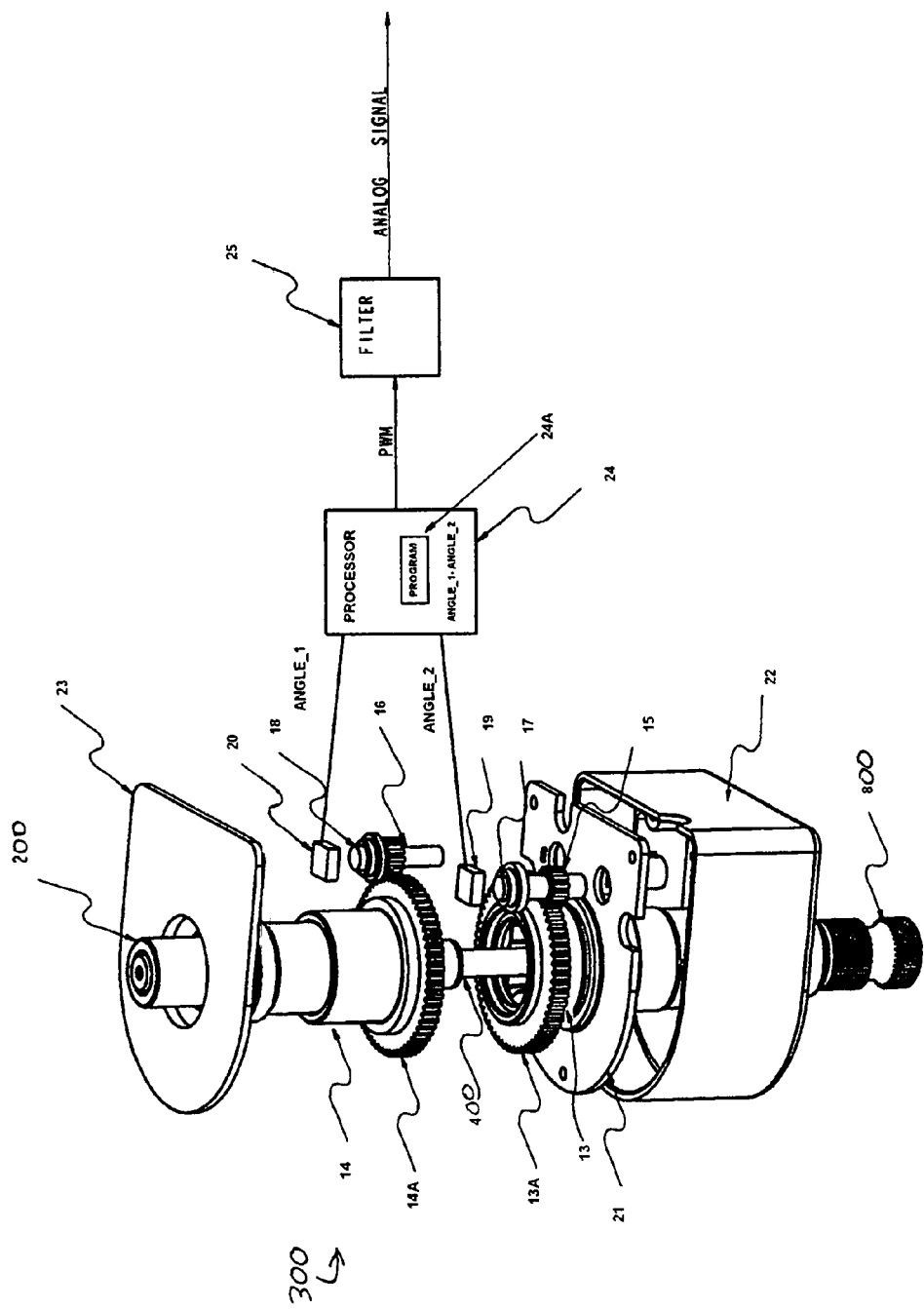
FIG. 3 is a partially exploded, partially schematic view of components of FIG. 2, in accordance with the exemplary embodiment of the present invention.

As best understood with reference to FIG. 3, the torque sensor 300 has a sensor unit proximate connected ends of the input and output shafts 200, 800. In accordance with the exemplary embodiment, the sensor unit includes two sensors that are semiconductor devices 19, 20. The semiconductor devices 19, 20 respectively function as angular encoders for two simple two-pole diametrically magnetized disc-shaped magnets 17, 18 that are respectively mounted to the tops of two pinion gears 15, 16. The pinion gears 15, 16 are respectively meshed with two spur gears 13A, 14A. When the electric power steering system of the exemplary embodiment of the present invention is fully assembled, the spur gears 13A, 14A are respectively fixedly connected to the input and output shafts 200, 800, as will be discussed in greater detail below. The pair of spur gear mechanisms advantageously increases the rotational angle difference between the input and output shafts 200, 800. By detecting the rotational angles at the pinion gear side of the spur gear mechanisms, the detection accuracy of the torque is advantageously increased in terms of resolution.

The angle encoders (e.g., semiconductor devices 19, 20) comprise non-contact Hall-effect sensing elements for respectively detecting the rotational angles of the magnets 17, 18. In accordance with the exemplary embodiment, resolution of each of the angle encoders is about 0.35 degrees, which is further enhanced to about 0.07 degrees by using the precise spur gear mechanism 13A, 14A. More specifically and in accordance with the exemplary embodiment, resolution of each of the angle encoders is 0.35 degrees, which is further enhanced to 0.07 degrees by using the precise spur gear mechanism 13A, 14A. Other resolutions are also within the scope of the present invention.

As will be discussed in greater detail below, the rotational angle detected by the two encoders (e.g., semiconductor devices 19, 20) is further processed in a processor 24 to calculate the torque applied at the device for controlling steering of the vehicle (e.g., the steering wheel 1 of FIG. 1) and a proportional electrical signal (e.g., voltage) is communicated to the electronic control unit ("ECU") 6 (FIG. 1) which controls operation of the motor 7 (FIG. 1) accordingly. Torque is calculated by multiplying the torsion stiffness of the torsion bar 400 and the angle difference between the two encoders (semiconductor devices 19, 20), as will be discussed in greater detail below. Advantageously, the system of the exemplary embodiment of the present invention can be highly reliable due, for example, to its including a non-contact sensing mechanism.

Figure 2:
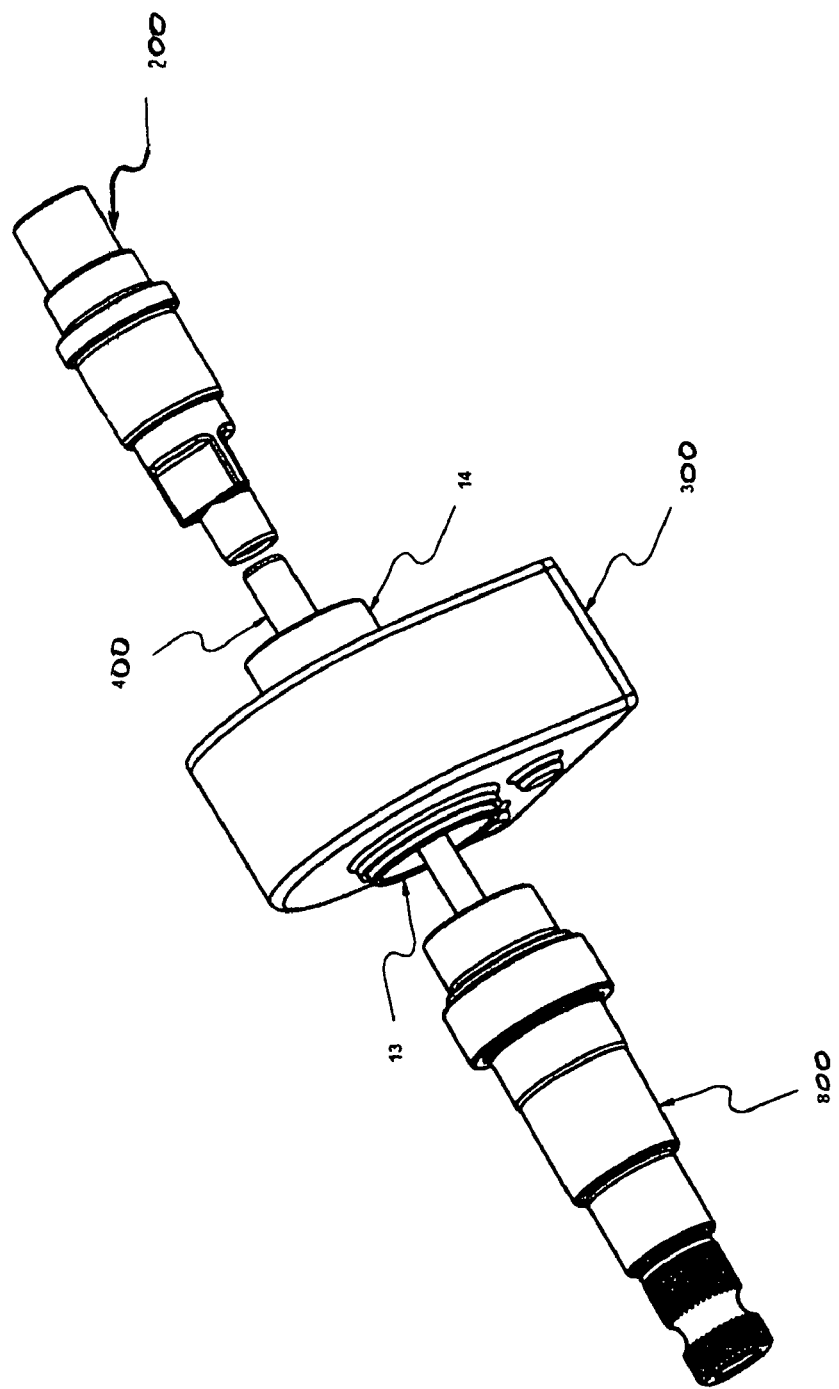
FIG. 2 shows a torque sensor, torsion bar, input shaft and output shaft, with the input and output shafts shown at least partially exploded away from one another, in accordance with an exemplary embodiment of the present invention.

Referring in greater detail to FIG. 2, it shows the torque sensor 300 accompanying the input and output shafts 200, 800. The torque sensor 300 is mounted inbetween the input and output shafts 200, 800. An upper rotor 14 of the torque sensor 300 is fixed with respect to (e.g., fixedly mounted to) the input shaft 200. A lower rotor 13 of the torque sensor 300 is fixed with respect to (e.g., fixedly mounted to) the output shaft 800. The input and output shafts 200, 800 are connected to one another by way of the torsion bar 400. More specifically, a first end of the torsion bar 400 is connected (e.g., with the connection comprising a dowel pin (not shown)) to the input shaft 200, so that the first end of the torsion bar 400 rotates with the input shaft. An opposite second end of the torsion bar 400 is connected (e.g., with the connection comprising a dowel pin (not shown)) to the output shaft 800, so that the second end of the torsion bar 400 rotates with the output shaft. As will be discussed in greater detail below, the torsion bar 400 can be twisted, so that there can be relative rotation between the input and output shafts 200, 800.

Referring in greater detail to FIG. 3, the torque sensor 300 includes a sensor housing 22, support plate 21, top cover 23, lower rotor 13, upper rotor 14, lower pinion gear 15 meshed with the spur gear 13A of the lower rotor 13, upper pinion gear 16 meshed with the spur gear 14A of the upper rotor 14, magnet 17 fixed on top of the lower pinion gear 15, magnet 18 fixed on top of the upper pinion gear 16, and the processing semiconductor devices 19, 20 respectively above the lower pinion gear 15 and the upper pinion gear 16. Involute teeth are cut in the periphery of lower rotor 13 and upper rotor 14 to respectively form the spur gear 13A of the lower rotor 13 and the spur gear 14A of the upper rotor 14. The spur gears 13A, 14A are respectively meshed with similar teeth of the pinion gears 15, 16. In accordance with the exemplary embodiment of the present invention, the gear ratio between each spur gear 13A, 14A and its respective pinion gear 15, 16 is about five or six to one, or more specifically five or six to one. Other ratios are within the scope of the present invention.

The support plate 21 and the top cover 23 support the lower rotor 13 and the upper rotor 14, respectively. The lower and upper rotors 13, 14 can rotate relative to each other. The two-pole rotary magnets 17, 18 are respectively press fitted on the top of the pinion gears 15, 16. In accordance with the exemplary embodiment of the present invention, a printed circuit board ("PCB") assembly comprises the two semiconductor devices 19, 20, a processor 24 and electrical signal filter components 25. The semiconductor devices 19, 20 are respectively aligned co-axially with the rotary magnets 17, 18 attached at the top of the pinion gears 15, 16. For each of the semiconductor devices 19, 20 and its corresponding magnet 17 or 18, a gap between the top surface of the magnet and the bottom surface of the chip/semiconductor device is typically closely maintained within a range of about 0.5 mm to about 1.2 mm, or more specifically in a range of 0.5 mm to 1.2 mm.

The Hall-effect type of semiconductor device 19 is used to detect the rotation angle of the magnet 17. The magnet 17 is associated with the input shaft 200, via the upper rotor 14 and the pinion gear 16, so that the rotation angle of the magnet 17 is proportional to the rotation angle of the input shaft. The Hall-effect type of semiconductor device 20 is used to detect the rotational angle of the magnet 18. The magnet 18 is associated with the output shaft 800, via the lower rotor 13 and the pinion gear 15, so that the rotation angle of the magnet 18 is proportional to the rotation angle of the output shaft. The gear ratio between the spur gears 13A, 14A and the pinion gears 15, 16 is used to increase the accuracy of the torque sensor 300 in terms of resolution. When torque is applied at the steering wheel 1, it creates, via twisting of the torsion bar 400, the angle difference between input and output shafts 200, 800. The semiconductor devices 19, 20 indirectly detect the rotational angle of the input and output shafts 200, 800, respectively, via the rotation angles of the magnets 17, 18, respectively.

In accordance with the exemplary embodiment of the present invention, the processor 24 (e.g., computer processor) includes (e.g., executes) a program 24A (e.g., algorithm, software module, or the like) for calculating the torque applied at the steering wheel 1. Very generally described, the processor 24, under control of the program 24A, calculates the angle difference between the angles measured by the semiconductor devices 19, 20 and calculates the torque by multiplying the calculated angle difference by the stiffness constant of the torsion bar 400. This information is modulated on a pulse width modulation ("PWM") waveform at a preset frequency. This PWM signal is converted into an analog signal using the filter components 25. In accordance with the exemplary embodiment of the present invention, the filter components 25 comprise a second-order low-pass filter. The analog signal transmitted by the filter components 25 is proportional to the torque applied at the steering wheel 1.

Figure 4:
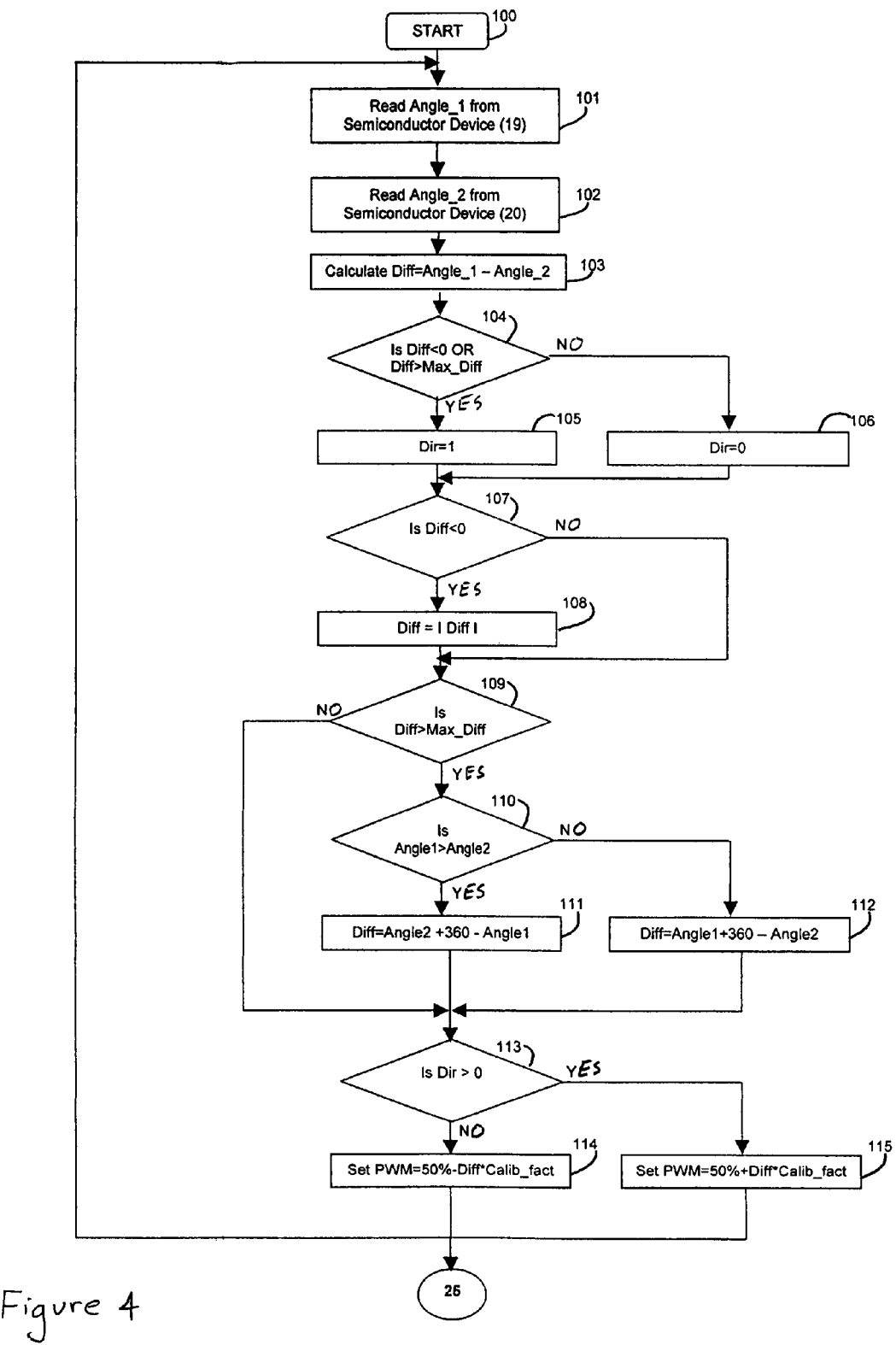
FIG. 4 presents a flowchart that illustrates a method that may be used in conjunction with the torque sensor for generating a pulse width modulation signal proportional to the torque applied at the steering wheel, in accordance with the exemplary embodiment of the present invention.

FIG. 4 presents a flow chart that illustrates operations, steps, software modules or the like associated with the processor 24 executing the program 24A for generating the PWM signal that is proportional to the torque applied at the steering wheel 1, in accordance with the exemplary embodiment of the present invention. Referring in greater detail to FIG. 4, at block 100 the program 24A starts, at which time the processor 24 initializes various variables and checks the memory blocks (e.g., computer memory).

Blocks 101 and 102 are illustrative of the processor 24 respectively receiving angular readings originating from the semiconductor devices 19, 20. More specifically, the angular reading that is received by the processor 24 from the semiconductor device 19 at block 101 is referred to as "Angle 1" in the context of FIG. 4. The angular reading that is received by the processor 24 from the semiconductor device 20 at block 102 is referred to as "Angle 2" in the context of FIG. 4.

At block 103, the difference between Angle 1 and Angle 2 is calculated, and this difference is referred to as "Diff" in the context of FIG. 4.

At block 104, Diff is judged with respect to a predefined parameter that is referred to as "Max Diff" in the context of FIG. 4, and the direction of steering is ascertained in conjunction with blocks 105 and 106. The direction of steering is referred to as "Dir" in the context of FIG. 4. If control is transferred from block 104 to block 105, then Dir is set equal to one at block 105. If control is transferred from block 104 to block 106, then Dir is set equal to zero at block 106.

At block 107, a determination is made as to whether Diff is a negative value. If it is determined at block 107 that Diff is negative, then control is transferred to block 108, where Diff becomes the absolute value of Diff. If it is determined at block 107 that Diff is positive, then control is transferred to block 109.

At block 109, Diff is judged with the predefined parameter Max Diff. If it is determined at block 109 that Diff is not greater than Max Diff, then control is transferred to block 113.

If it is determined at block 109 that Diff 108 is greater than Max Diff, then control is transferred to block 110. At block 110, it is judged whether Angle 1 is greater than Angle 2.

If it is determined at block 110 that Angle 1 is greater than Angle 2, then control is transferred to block 111. At block 111, Diff is modified to accommodate zero crossing of angle data of the semiconductor device 20, by setting Diff equal to Angle 2 plus three hundred sixty minus Angle 1. Then control is transferred to block 113.

If it is determined at block 110 that Angle 1 is not greater than Angle 2, then control is transferred to block 112. At block 112, Diff is modified to accommodate zero crossing of angle data of the semiconductor device 19, by setting Diff equal to Angle 1 plus three hundred sixty minus Angle 2. Then control is transferred to block 113.

Directional status is checked at block 113. More specifically, if it is determined at block 113 that Dir is greater than zero, then control is transferred to block 115. On the other hand, if it is determined at block 113 that Dir is not greater than zero, then control is transferred to block 114.

After checking the direction status at block 113, the PWM signal is generated at block 114 or block 115. The PWM signal that is generated (at block 114 or block 115) is proportional to applied torque taking a predetermined calibration factor (which is referred to as "Calib fact" in the context of FIG. 4) and the most recently calculated Diff (which was calculated at either block 111 or block 112) into consideration. As schematically shown in FIG. 4, this PWM signal is sent to the signal filter components 25. In response, the filter components 25 provide an analog voltage output that is proportional to the PWM signal and hence the applied torque. The sequence described above with respect to FIG. 4 is typically continuously repeated at least while steering is taking place.

Referring to FIGS. 5 and 6 in greater detail, they show a profile 2A (e.g., a triangular profile) of the input shaft 200 that fits into a substantially correspondingly-shaped cavity 8A (e.g., a triangular cavity) of the output shaft 800. The profile 2A and cavity 8A are configured (e.g., predetermined clearance is provided therebetween) for allowing, yet restricting to a desired limit, angular relative movement between the input and output shafts 200, 800. In accordance with the exemplary embodiment of the present invention, the limited angular relative movement can be more specifically characterized as relative rotation between the input shaft 200 and the output shaft 800, with the relative rotation being about the coaxial, lengthwise axes of the input and output shafts.

Because the opposite ends of the torsion bar 400 respectively rotate with the input and output shafts 200, 800, the torsion bar 400 typically twists when the steering wheel 1 is turned. The torsion bar 400 is designed for a particular torque range, which one should experience in normal driving conditions. Higher torque, which may occur in certain situations, can damage the torsion bar 400 either by permanently deforming it or bringing in more hysteresis, as a result of the torsion bar being twisted beyond its primary linear range. Permanent deformation and/or hysteresis in the torsion bar 400, even at very small scales, accumulates over a period of time and eventually deteriorates the quality of the electrical signals provided by the torque sensor 300. Accordingly and in accordance with the exemplary embodiment of the present invention, an arrangement is provided for protecting the torsion bar 400 from having excessive torque applied thereto. This arrangement can be referred to as a "fail-safe arrangement", and this fail-safe arrangement can be provided by the cooperation between the profile 2A (e.g., the triangular profile) of the input shaft 200 and the correspondingly-shaped cavity 8A (e.g., the triangular cavity) of output shaft 800.

In accordance with the exemplary embodiment of the present invention, the triangular profile 2A of the input shaft 200 is inserted into the triangular cavity 8A of the output shaft 800 with there being a pre-determined angular clearance between the triangular profile 2A and the triangular cavity 8A. This angular clearance allows the torsion bar 400 to twist (e.g., in response to rotation of the input shaft 200 that occurs in response to torque being applied to the steering wheel 1) until the clearance between the triangular profile 2A and the triangular cavity 8A becomes zero. Once the clearance between the triangular profile 2A and the triangular cavity 8A becomes zero, the twist of the torsion bar 4 is limited by the torsional stiffness of the steering column, which is relatively high (as compared to the torsional stiffness of the torsion bar 400) and thus protects the torsion bar from crossing over the linear elastic range.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A torque sensor for an electric power steering system that has an output shaft for rotating in response to rotation of an input shaft, the torque sensor comprising:
   a first rotor for rotating with the input shaft;
   a second rotor for rotating with the output shaft, wherein the first rotor and the second rotor are mounted for there being relative rotation between the first rotor and the second rotor;
   a first pinion gear mounted for rotating about a first axis in response to rotation of the first rotor;
   a first magnet mounted for rotating about the first axis with the first pinion gear;
   a second pinion gear mounted for rotating about a second axis in response to rotation of the second rotor, wherein the second pinion gear is laterally spaced apart from the first pinion gear so that the second axis is laterally spaced apart from, and thereby not coaxial with, the first axis;
   a second magnet mounted for rotating about the second axis with the second pinion gear, so that the second magnet is laterally spaced apart from the first magnet;
   a first sensor positioned for sensing an angular position of the first magnet; and
   a second sensor positioned for sensing an angular position of the second magnet, wherein the second sensor is laterally spaced apart from the first sensor.

2. The torque sensor of claim 1, wherein
   the first rotor comprises gear teeth;
   the second rotor comprises gear teeth;
   gear teeth of the first pinion gear are meshed with the gear teeth of the first rotor, so that the first pinion gear is directly driven by the first rotor; and
   gear teeth of the second pinion gear are meshed with the gear teeth of the second rotor, so that the second pinion gear is directly driven by the second rotor.

3. The torque sensor of claim 2, wherein:
   the first magnet is carried by the first pinion gear; and
   the second magnet is carried by the second pinion gear.

4. The torque sensor of claim 3, wherein:
   the first magnet is two-pole magnet;
   the second magnet is two-pole magnet;
   the first sensor is co-axially aligned with the first axis; and
   the second sensor is co-axially aligned the second axis.

5. The torque sensor of claim 1, in combination with at least the input shaft and the output shaft, wherein:
   the second rotor is connected to the output shaft for rotating with the output shaft;
   the first rotor is connected to the input shaft for rotating with the input shaft;
   the combination further comprises a torsion bar; and
   the output shaft and the input shaft are connected to one another via the torsion bar.

6. The combination according to claim 5, wherein
   a first end of the torsion bar is connected to the input shaft so that the first end of the torsion bar rotates with the input shaft; and
   a second end of the torsion bar is connected to the output shaft so that the second end of the torsion bar rotates with the output shaft.

7. The combination according to claim 5, wherein:
   the input shaft and the output shaft are operatively associated with one another via a cavity being in receipt of a profile; and
   the cavity and the profile are cooperative for allowing, yet restricting to a predetermined limit, relative rotation between the input shaft and the output shaft.

8. The combination according to claim 7, wherein:
   the cavity is defined by a first component selected from the group consisting of the input shaft and the output shaft;
   the profile is defined by a second component that
      is selected from the group consisting of the input shaft and the output shaft, and is not the first component; and the cavity and the profile are each triangular.

9. The combination according to claim 7, wherein:

one of the input shaft and the output shaft comprises the cavity; and the other of the input shaft and the output shaft comprises the profile.

10. The combination according to claim 7, wherein:

the input shaft comprises the profile; and the output shaft comprises the cavity.

11. The torque sensor of claim 1, further comprising a housing that at least partially contains at least each of the first rotor, the second rotor, the first pinion gear, and the second pinion gear.

12. The torque sensor of claim 11, wherein:

the housing includes a support plate and a cover;

the second rotor is positioned at least partially in a lower portion of the housing;

at least a portion of each of the first rotor, the first pinion gear, the first magnet, the second pinion gear, the second magnet, the first sensor and the second sensor is positioned between the support plate and the cover.

13. The torque sensor of claim 1, further comprising a processing apparatus operatively associated with the first and second sensors for receiving signals that are respectively indicative of the angular position of the first magnet and the angular position of the second magnet, wherein the processing apparatus is for processing the signals.

14. The torque sensor of claim 13, wherein the processing apparatus comprises a processor and an algorithm.

15. The torque sensor of claim 13, wherein the processing apparatus is operative for determining an angular difference between the first magnet and the second magnet.

16. The torque sensor of claim 15, wherein the processing apparatus is further operative for generating a pulse width modulation signal that is proportional to the angular difference between the first magnet and the second magnet.

17. The torque sensor of claim 16, further comprising a filter apparatus for converting the pulse width modulation signal to an analogue voltage signal proportional to torque applied to the input shaft.

18. The torque sensor of claim 1, wherein:

the first sensor is positioned above the first pinion gear, and the second sensor is positioned above the second pinion gear.

19. The torque sensor of claim 1, comprising a housing containing each of the first sensor, the first pinion gear, the second sensor and the second pinion gear, wherein:

the housing includes a support plate that supports the second rotor, the support plate has opposite first and second sides, the first side of the support plate faces toward each of the first sensor, the first pinion gear, the second sensor and the second pinion gear, the first pinion gear is positioned between the first sensor and the first side of the support plate, and the second pinion gear is positioned between the second sensor and the first side of the support plate.

20. The torque sensor of claim 1, comprising a printed circuit board including:

the first sensor and the second sensor.

21. The torque sensor of claim 1, wherein:

a first predetermined distance is between the first magnet and the first pinion gear, a second predetermined distance is between the second magnet and the second pinion gear, and the second predetermined distance is greater than the first predetermined distance.

22. A torque sensor for an electric power steering system that has an output shaft for rotating in response to rotation of an input shaft, the torque sensor comprising:

a first rotor for rotating with the input shaft, wherein the first rotor comprises gear teeth;

a second rotor for rotating with the output shaft, wherein the second rotor comprises gear teeth, and the first rotor and the second rotor are mounted for there being relative rotation between the first rotor and the second rotor;

a first pinion gear that is mounted for rotating about a first axis, and so that gear teeth of the first pinion gear are meshed with the gear teeth of the first rotor, so that the first pinion gear is directly driven by the first rotor;

a second pinion gear that is mounted for rotating about a second axis, and so that gear teeth of the second pinion gear are meshed with the gear teeth of the second rotor, so that the second pinion gear is directly driven by the second rotor, wherein the second pinion gear is laterally spaced apart from the first pinion gear so that the second axis is laterally spaced apart from, and thereby not coaxial with, the first axis;

a two-pole first magnet mounted to the first pinion gear for rotating with the first pinion gear about the first axis;

a two-pole second magnet mounted to the second pinion gear for rotating with the second pinion gear about the second axis, so that the two-pole second magnet is laterally spaced apart from the two-pole first magnet; and a printed circuit board including a first Hall effect sensor that is co-axially aligned with the first axis for sensing an angular position of the first magnet, and a second Hall effect sensor that is co-axially aligned with the second axis for sensing an angular position of the second magnet, wherein the second Hall effect sensor is laterally spaced apart from the first Hall effect sensor so that the first Hall effect sensor is not co-axially aligned with the second axis, and the second Hall effect sensor is not co-axially aligned with the first axis, wherein the first magnet is positioned between the printed circuit board and the first pinion, and wherein the second magnet is positioned between the printed circuit board and the second pinion.

23. The torque sensor of claim 22, in combination with at least the input shaft and the output shaft, wherein:

the second rotor is connected to the output shaft for rotating with the output shaft;

the first rotor is connected to the input shaft for rotating with the input shaft;

the combination further comprises a torsion bar;

a first end of the torsion bar is connected to the input shaft so that the first end of the torsion bar rotates with the input shaft, and a second end of the torsion bar is connected to the output shaft so that the second end of the torsion bar rotates with the output shaft, so that the output shaft and the input shaft are connected to one another via the torsion bar;

the input shaft and the output shaft are operatively associated with one another via a triangular cavity being in receipt of a triangular profile;

the triangular cavity and the triangular profile are cooperative for allowing, yet restricting to a predetermined limit, relative rotation between the input shaft and the output shaft;

one of the input shaft and the output shaft comprises the triangular cavity; and the other of the input shaft and the output shaft comprises the triangular profile.

24. The torque sensor of claim 22, further comprising a processing apparatus operatively associated with the first and second Hall effect sensors for receiving signals that are respectively indicative of the angular position of the first magnet and the angular position of the second magnet, wherein the processing apparatus is operative for determining an angular difference between the first magnet and the second magnet, and the processing apparatus is further operative for generating a pulse width modulation signal that is proportional to the angular difference between the first magnet and the second magnet; and a filter apparatus for converting the pulse width modulation signal to an analogue voltage signal proportional to torque applied to the input shaft.

25. A torque sensor for an electric power steering system, the torque sensor comprising:

an input shaft mounted for rotating;

a torsion bar connected to the input shaft;

an output shaft connected to the torsion bar for rotating in response to rotation of an input shaft;

a first rotor connected to the input shaft for rotating with the input shaft;

a second rotor connected to the output shaft for rotating with the output shaft, wherein the torsion bar is adapted for there being relative rotation between the input shaft and the output shaft, and thereby relative rotation between the first rotor and the second rotor;

a first pinion gear mounted for rotating in response to rotation of the first rotor;

a first magnet mounted for rotating with the first pinion gear;

a second pinion gear mounted for rotating in response to rotation of the second rotor;

a second magnet mounted for rotating with the second pinion gear;

a first sensor positioned for sensing an angular position of the first magnet;

a second sensor positioned for sensing an angular position of the second magnet;

the input shaft and the output shaft being operatively associated with one another via a triangular cavity being in receipt of a triangular profile, and the triangular cavity and the triangular profile being cooperative for allowing, yet restricting to a predetermined limit, the relative rotation between the input shaft and the output shaft;

the triangular cavity being defined by a first component selected from the group consisting of the input shaft and the output shaft; and the triangular profile being defined by a second component that is selected from the group consisting of the input shaft and the output shaft, and is not the first component.

26. The torque sensor of claim 25, wherein each of the cavity and the profile have truncated corners.

* * * * *